United States Patent [19]
Shaw

[11] 3,708,404
[45] Jan. 2, 1973

[54] METHOD OF MAKING AN ELECTRODE FOR ELECTROCHEMICAL MILLING

[75] Inventor: Richard H. Shaw, Hampden, Mass.
[73] Assignee: United Aircraft Corporation, East Hartford, Conn.
[22] Filed: April 5, 1971
[21] Appl. No.: 131,321

[52] U.S. Cl. .....................204/16, 29/25.18, 204/284
[51] Int. Cl............C23b 7/00, B01k 3/04, H01j 9/16
[58] Field of Search..............29/25.17, 25.18, 630 E; 204/16, 25, 9, 284

[56] References Cited

UNITED STATES PATENTS

| | | | |
|---|---|---|---|
| 3,019,178 | 1/1962 | Williams | 204/284 |
| 3,276,988 | 10/1966 | Williams | 204/284 |
| 3,288,698 | 11/1966 | Bruns | 204/284 |
| 2,499,977 | 3/1950 | Scott | 148/4 |
| 330,247 | 11/1885 | Liepmann | 204/16 |

FOREIGN PATENTS OR APPLICATIONS

| | | | |
|---|---|---|---|
| 602,485 | 3/1926 | France | 204/16 |

Primary Examiner—John H. Mack
Assistant Examiner—T. Tufariello
Attorney—Charles A. Warren

[57] ABSTRACT

A method of forming an electrode for electrochemically milling a slot or other noncircular holes in a work piece including the steps of securing a plurality of conductive tubes together, enclosing the tubes in a metallic covering to form an assemblage, closing the ends of the tube at least at one end of the assemblage, attaching a mounting ring if necessary, removing the closed ends of the tubes and forming one end to function as an electrode tip.

7 Claims, 10 Drawing Figures

PATENTED JAN 2 1973

3,708,404

INVENTOR
RICHARD H. SHAW

Charles A. Warren
ATTORNEY

METHOD OF MAKING AN ELECTRODE FOR ELECTROCHEMICAL MILLING

BACKGROUND OF THE INVENTION

The Joslin application Ser. No. 54,496 filed July 13, 1970 now U.S. Pat. No. 3,647,674 shows a method of forming electrodes for small diameter cylindrical holes, such holes being on the order of 18 to 20 mils in diameter at a minimum. Shaw Ser. No. 131,323 filed Apr. 5, 1971 is an improvement on Joslin in the simplification of the attachment means for the dielectric to the surface of the tube used in the electro-chemical milling. Many times, however, other than cylindrical holes are needed. Both these applications have the same assignee as this application.

SUMMARY OF THE INVENTION

This invention relates to an electrode for use in electro-chemical drilling and is adapted for forming other than cylindrical holes such as slots for example.

One feature of the invention is an electrode usable in forming other than cylindrical holes in a work piece and is particularly adapted for forming slots of a relatively small dimension in a work piece.

The principal feature of the invention is a method by which such an electrode may be made to provide a durable electrode capable of producing the small dimension slots presently required. One feature is an electrode for forming slots or the like which may also incorporate the features of the above described Joslin and Shaw applications.

According to the present invention, the electrode comprises a plurality of tubes held together and enclosed by a metallic conductive coating over which a dielectric coating is applied with the tip configuration so formed as to minimize peeling of the dielectric from the electrode. The method of the present invention includes the steps of securing together near opposite ends thereof a plurality of parallely arranged tubes substantially longer than the finished electrode, closing the ends of the tubes, electroplating on said tubes a substantially thick covering to hold the tubes together and enclose them to form an assemblage of tubes, applying a thin dielectric coating to said electrode element over a substantial length of the tubes in the area of the tubes that becomes the electrode entering the slot being formed, and removing the closed ends and shaping the electrode tip to form an electrode. Additional steps may be the shaping of the portion of the tubes that becomes the electrode tip to a particular configuration to retain the dielectric in position, finishing the surface of the coating to form opposed flat side walls with interconnecting arcuate end surfaces and positioning a mounting ring around the electrode element to hold it in position.

DESCRIPTION OF THE PREFERRED EMBODIMENT

Figure 1:
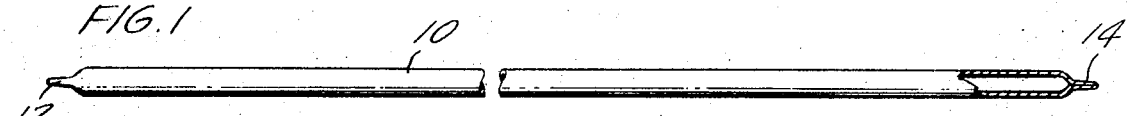
FIG. 1 shows one of the first steps in making the electrode.
Figure 2:
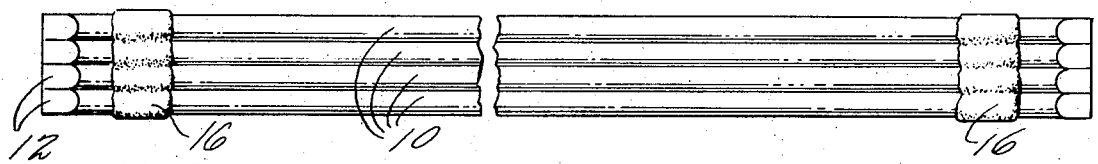
FIG. 2 shows additional steps in the making of the electrode.

Referring first to FIG. 1, a plurality of conducting metal tubes 10 substantially longer than the finished electrode have their ends 12 and 14 crimped to close them as shown. The several tubes are then secured together in parallel relation to one another as shown in FIG. 2 by suitable solder 16 or other attachment devices located near the ends of the tube as shown. These attachment means are spaced apart to leave therebetween a greater length than the finished electrode as will be apparent.

The attached tubes are then coated with a conductive metallic coating 18 such as silver as by electroplating the tubes. This coating is built up to a substantial thickness as shown and forms with the tubes an assemblage ready for further steps in the formation of the electrode. The closed tube ends serve to prevent any electroplating from occurring on the bores of the tubes so that these will not be closed in any way.

Figure 3:
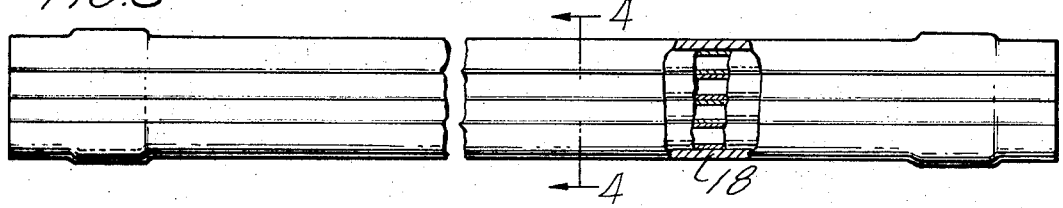
FIG. 3 shows an electrode assemblage after further steps have been performed.
Figure 4:
FIG. 4 is a section through the assemblage of FIG. 3.

In the particular example shown, the tubes are preferably a beryllium copper alloy and are relatively thin as, for example, with an O.D. of 14 mils and an I.D. of 6 mils giving a wall thickness of 4 mils (0.004 inches). The coating applied by electroplating is preferably substantially thicker than in the tube wall thickness and thus at least about 6 mils thick. The work piece is then in the condition of FIGS. 3 and 4 and the opposite side surfaces 20 and 22 are non-planer as shown since the plating forms a substantial uniform thickness over the walls of the tubes.

Figure 5:
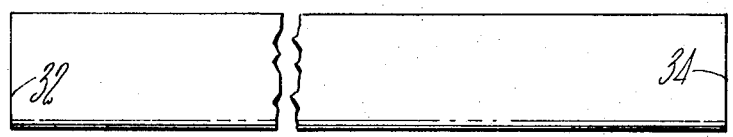
FIG. 5 shows further steps performed on the assemblage.
Figure 6:
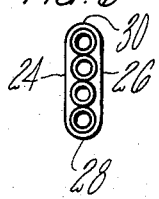
FIG. 6 is a sectional view through the electrode element of FIG. 5.

The next steps are to cut the assemblage at each end to remove the securing means 16 and the closed ends 12 and 14. The electroplated enclosing material is also machined so that the opposite side walls 24 and 26 are smooth and in parallel relation to each other and the end walls 28 and 30 are arcuate and in parallel relation to the enclosed tube wall surfaces. The electrode element at this time, as shown in FIGS. 5 and 6, will have the tube ends 32 and 34 open and with a thickness of electroplated coating over the tubes of about 4 mils at a minimum and increasing in thickness in the grooves between adjacent tubes.

Figure 7:
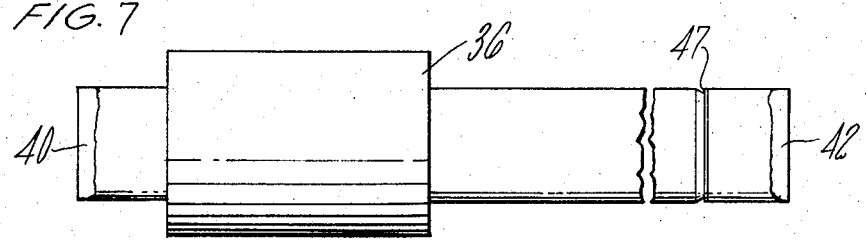
FIG. 7 shows the addition of the mounting ring and other steps.

At this time a mounting ring 36 is attached around the electrode element and is secured thereto as by a metallic material 38 inserted at each end of the ring. This may be a low melting alloy or a soft solder and provides a device for securing the finished electrode in the apparatus in which it is to be used. At the same time the new ends of the tube are crimped to be closed as at 40 and 42, FIG. 7. Obviously the mounting ring 36 is positioned around the tube assemblage at a position spaced from both ends of the tube but more closely spaced from the crimped end 40.

With the mount ring in the position shown and the tube ends closed, the electrode element has a dielectric material applied thereto between the ring and the crimped end 42 to form a relatively thin coating 44 of dielectric material over this portion of the electrode. This thin coating may be of any suitable dielectric material, a particularly satisfactory material which serves as an imperforate dielectric is the material known as Parylene "C", a product of Union Carbide. This coating has been found to be effective on an electrode of this type when applied to a thickness of about 0.3 mils.

After the dielectric coating is applied, the assemblage is again cut to remove the crimped ends 40 and 42. The purpose of these crimped ends has been to prevent the entry of the dielectric coating within the bore of the tubes while the coating is being applied since with a bore of this diameter it could be seriously blocked by the entry of only a minimum amount of the dielectric therein. Preferably the assemblage adjacent the crimped end 40 is cut directly at the end of the mounting ring 36 and the other end 42 is cut back to leave the necessary length of operative electrode between the ring 36 and the finished electrode tip 46.

The assemblage may have the finished tip 46 formed as described in the pending application of Shaw Ser. No. 131,323 filed Apr. 5, 1971 in which case the electrode tip will have a notch 47 spaced back slightly from the flat end surface 48 at the extreme end of the tip. As described in the Shaw application, the notch 47 is formed in the surface of the electrode prior to the application of the dielectric coating 44 and the finished functioning tip on the electrode is completed by the formation of the flat end surface 48, an oblique connecting surface 50, and a peripheral surface 52 extending back to the notch 47. The peripheral surface 52 is free of the dielectric coating which terminates within the notch 47 and by reason of this arrangement is a substantially permanent dielectric coating. This particular tip formation is described and claimed in the Shaw application and is not a part of the present invention.

Figure 9:
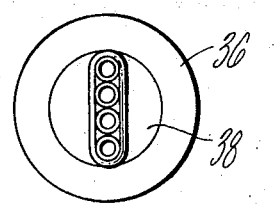
FIG. 9 is an end view of FIG. 8.
Figure 8:
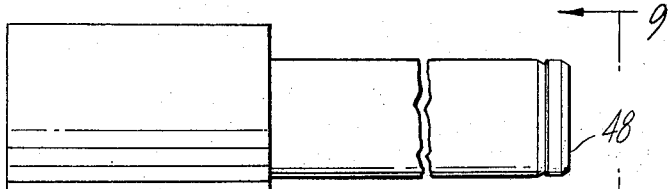
FIG. 8 shows a finished electrode.
Figure 10:
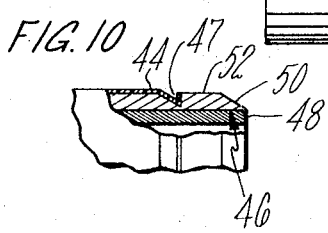
FIG. 10 is a fragmentary longitudinal section through the operative tip of the electrode of FIG. 8.

The electrode ready for use is shown in FIGS. 8 and 9 and includes the mount ring, the connection from said ring to the tube assemblage, and the tubes with the enclosing and attaching conductive material thereon projecting from one end of the ring. The assemblage of tubes and enclosing metallic covering has a dielectric coating thereon and the end of the assemblage has the suitable tip preparation necessary for high speed electrochemical machining.

Under certain circumstances the dielectric may be applied prior to removing the securing means 16 and the closed ends, but, in general, this removal facilitates in shaping the outer surface of the conductive coating 18.

What is claimed is:

1. The method of forming an electrode for electrochemically drilling including the steps of
    1. securing a plurality of tubes together in parallel relation by means located near at least one end of the tubes,
    2. closing the adjacent ends of said tubes,
    3. electroplating said tubes to enclose said tubes and secure them together to form an assemblage,
    4. coating the assemblage with a thin dielectric coating,
    5. cutting from the assemblage the securing means near said one end and the portion of the tubes to which said means are attached to leave a cut end,
    6. and shaping the assemblage at said cut end to provide a cutting tip for the electrode.
2. The method of claim 1 with the additional step of attaching a support ring around said assemblage at a point spaced from said one end.
3. The method of claim 2 in which the dielectric coating extends from said one end to the support ring.
4. The method of claim 1 including an additional step of finishing the surface of the electroplated coating to form opposed flat side walls with interconnecting arcuate surfaces at opposite ends of the tube assemblage.
5. The method of forming an electrode for electrochemically drilling including the steps of
    1. securing together near opposite ends a plurality of parallely arranged tubes substantially longer than the finished electrode,
    2. closing the ends of said tubes,
    3. electroplating on said tubes a substantially thick covering to hold said tubes together and enclose them to form an assemblage of tubes and covering,
    4. cutting the ends from said assemblage to remove said securing means and form an electrode element,
    5. closing the tubes at one end of the electrode element,
    6. applying a thin dielectric coating to said electrode element from the closed ends for a substantial distance therefrom,
    7. removing said closed ends of the tubes to leave a cut end on the assemblage and
    8. shaping the electrode element at said cut end to form an operative electrode tip.
6. The method of claim 5 including the additional step of finishing the electroplated surface to form opposed flat side walls with interconnecting arcuate surfaces at opposite ends of the assemblage.
7. The method of claim 6 including the additional step of positioning a mounting ring around said electrode element and securing it thereto.

* * * * *